May 25, 1965 G. ANDREOLI 3,185,028
LIGHT AND IMAGE PROJECTORS
Original Filed June 11, 1959 3 Sheets-Sheet 1
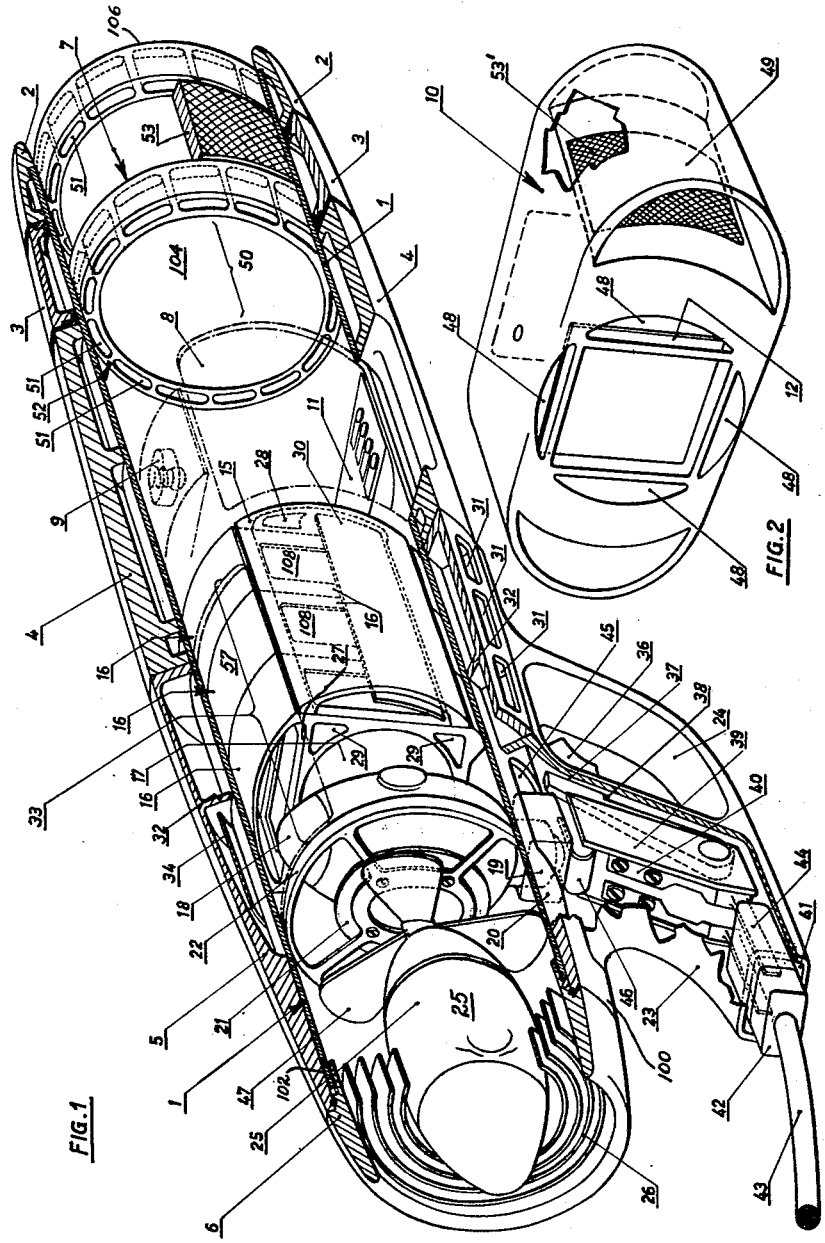
INVENTOR:
GIANNI ANDREOLI

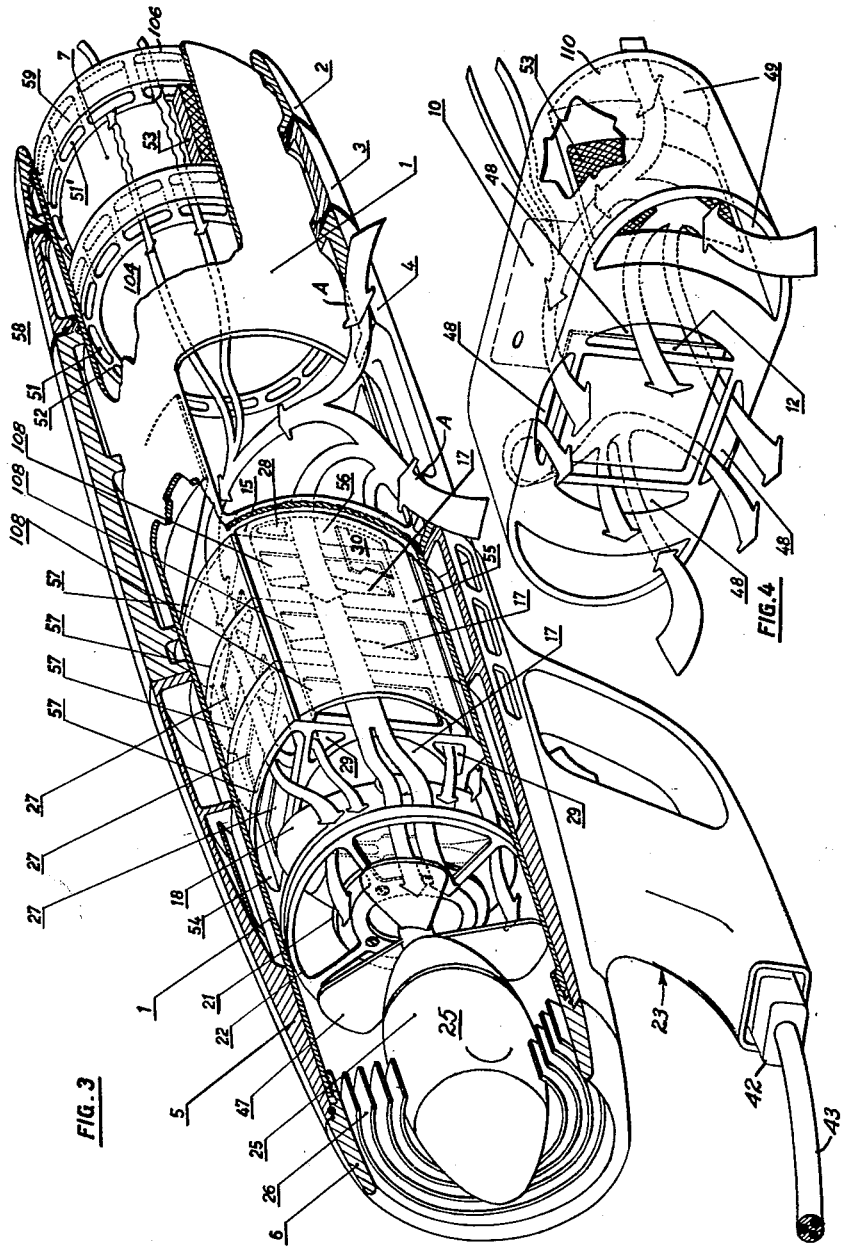

May 25, 1965 G. ANDREOLI 3,185,028
LIGHT AND IMAGE PROJECTORS
Original Filed June 11, 1959 3 Sheets-Sheet 3
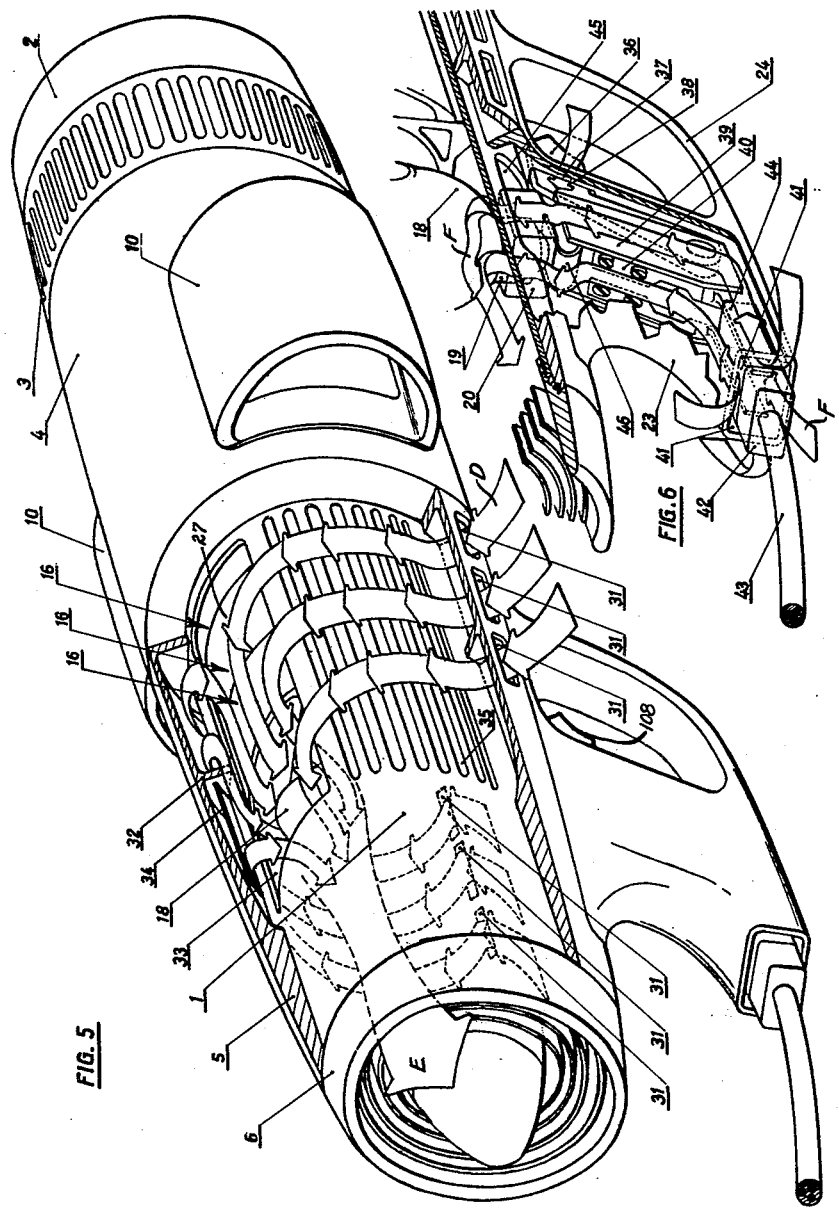
INVENTOR:
GIANNI ANDREOLI United States Patent Office 3,185,028
Patented May 25, 1965

3,185,028
LIGHT AND IMAGE PROJECTORS
Gianni Andreoli, Lucerne, Switzerland, assignor to
Mitralux Establishment, Vaduz, Liechtenstein
Continuation of application Ser. Nos. 819,728, June 11,
1959 and 161,714, Dec. 22, 1961. This application
May 31, 1962, Ser. No. 198,805
Claims priority, application Switzerland, July 15, 1958,
61,786
13 Claims. (Cl. 88—24)

This is a continuation of applications Serial No. 819,728 filed June 11, 1959 and Serial No. 161,714 filed December 22, 1961, now abandoned.

This invention relates in general to light and image projectors and in particular to a new and useful light and image projector including a novel barrel casing construction which is provided with a pistol hand grip and including means therein for arranging the various parts such as lens systems, lamp, and image media loading bracket, and for conducting a cooling air flow over each of the parts during the operation thereof.

The present invention is particularly applicable for either directing a high intensity light image or for projecting an image from an object such as a diapositive, stencil, diaphragm, grid and the like. Of particular importance in the construction of a device of this nature is to provide for the easy accessibility of the various component parts such as the objective lenses, the condensing lenses, the lamp and various associated parts. With a high light intensity projector of this type, it is also critically essential that the various components, lenses and electrical parts be adequately cooled. Prior to the present invention, housings have been provided with air fans in which cooling air has been directed over the various components in various flow directions. A disadvantage of most constructions of this type is that either the parts are very inaccessible, or the cooling of the various parts is not adequate in some locations of the housing. In many instances there are dead air spaces in which very little cooling air circulation is accomplished.

In accordance with the present invention, there is provided a projector construction which includes a basic tubular housing member or chassis having means for arranging along the length thereof an objective lens system, a magazine receiver for a loader carrying objects for presentation, one or more condenser lenses, a light system including a lamp and reflector and a cooling air fan. A feature of the construction is that the parts are arranged in a novel manner along the barrel-shaped chassis and access to each of these parts is easily accomplished. The various elements are aligned in a manner and constructed so that a cooling fan arranged at one end will direct a cooling air flow over each of the parts along at least one and in some locations several cooling flow paths defined along the chassis length. To further enhance the cooling, a surrounding casing is arranged around the chassis and is provided with means defining a separate air duct for flow around the chassis exterior and thence axially along the interior. A flow path is also defined along the length of the chassis interior around the component parts from the forward end to the rear. In addition, electrical connections are made through a pistol grip handle and cooling air flow is also provided upwardly through the handle to the interior of the chassis.

A further feature of the invention is the provision of lens mounts which include holders defining peripheral openings at all sides, top and bottom for the separate cooling air flow therethrough. The housing and the lens mounts are arranged so that a separate cooling air flow stream is directed along the exterior of each of the lens portions to insure adequate cooling. Such cooling air flow also may take place, in addition to through the chassis, across the lenses of the device by baffling arrangements.

At least three separate air streams are advantageously circulated through the housing and over the various projecting elements or parts. One air stream originates from the end of the chassis and flows downwardly between the chassis and the exterior casing, another air stream originates intermediate the chassis, flows around between the chassis and the casing and also over the loading elements and joins with the first air stream and flows through the lens holders for the condenser lens and then past the projecting system. Still a further air stream originates at the base of the handle grip and flows upwardly through the handle and over the electrical circuit connecting the lamp, across the lamp, to join with the main through-flow through the chassis which is discharged through the rear end thereof.

Accordingly, it is an object of this invention to provide an improved light and image projector.

A further object of the invention is to provide a light and image projector which includes a tubular chassis construction having means for accommodating a plurality of lens mounts carrying lenses, the arrangement being such that cooling air is directed through a plurality of flow paths over the various parts.

A further object of the invention is to provide a light and image projector including a tubular chassis construction having spaced supporting means for accommodating a plurality of lens mounts for each of the projecting and condensing lenses, means defining a loader chamber, and means for supporting a lamp and projecting reflector all in alignment with a fan arranged to draw an air stream through and over the various parts.

A further object of the invention is to provide a light and image projector which includes a barrel construction mounted on a handle member having a pistol grip in which cooling air flow is directed upwardly through the pistol handle grip and into the housing of the device.

A further object of the invention is to provide a mounting for lenses which mounting includes a housing having a plurality of openings defined at locations radially outwardly spaced in respect to the centrally held lenses to facilitate cooling air flow over the housing and lenses when arranged in association within the tubular chassis of a projector.

A further object of the invention is to provide a projector having means for accommodating a plurality of lenses which lenses are mounted in brackets adapted to conform to the housing and including chambers defined in the brackets between the exterior thereof and the periphery of the lenses.

A further object of the invention is to provide a projector which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

FIG. 1 is a right side perspective view, partly broken away, of a projector constructed in accordance with the invention;

FIG. 2 is a perspective view of the loader provided for holding objects for presentation in the projector;

FIG. 3 is a perspective view similar to FIG. 1 and indicating diagrammatically the flow of cooling air in a first duct defined between the barrel and the housing;

FIG. 4 is a perspective view of the loader indicating the cooling air flow around the loader which forms a preliminary air duct in front of the first air duct;

FIG. 5 is a perspective view similar to FIG. 1 indicating the cooling air flow in a second air path; and FIG. 6 is a fragmentary perspective view of the handle indicating a cooling air flow in a third cooling air flow path.

Referring now to the drawings in particular, the invention embodied therein includes a light and image projector which comprises a central elongated cylindrical barrel housing or chassis generally designated 1 which is cut away or provided with slot openings at various locations along its length to removably accommodate the various components of the projecting system. The tubular chassis or barrel 1 forms the framework of the apparatus. Over the exterior of the barrel or tubular chassis 1 are fitted the casing elements, for example, a front casing portion 2, a rotatable casing adjusting collar 3 for the objective lenses, a middle casing portion 4, a sliding casing cap 5 and cap closure means 6. The middle casing portion 4 is advantageously secured to the barrel so that it is not moved relatively thereto normally during the operation or loading of the device. A feature of the construction, however, is that the remaining casing portions may be easily detached from the barrel.

The front casing portion 2 and the adjusting collar 3 are at a location of the reproducing objective lenses generally designated 7. The sliding casing cap 5 includes a cut away lower portion or slot to permit it to be slid axially and inserted around a mounting base portion 100 of a handle or pistol grip generally designated 23. The cap closure means 6 advantageously includes a collar having internal threads of a bayonet type construction which permits the collar to be positioned to the rear of the barrel and align the threads 102 to lock with threads located at the barrel rear 1. When the closure means is rotated to displace the threads 102 from alignment with the threads formed on the barrel 1, the sliding casing cap 6 which carries the closure means 6 may be removed outwardly to expose the entire rear portion of the barrel 1 for access to the parts which are located at such portion.

The reproducing system 7 which comprises, for example, a projecting or reproducing optical system comprising one or more objective lenses 104 which are mounted in novel mounting brackets or holders generally designated 52 which hold the lenses 104 centrally of a plurality of annular air flow ducts 51 which are defined in an annular marginal portion of the mounting brackets 52. The interior of the chassis 1 is also fitted with a centering frame member 106 which also includes annular passageways 51 for the flow of air inwardly from the forward end of the projector. The lenses 104 are displaceable axially by rotation of the collar 3.

The air flow entering a first air duct which is defined partially at the forward end is maintained free from dust by means of filtering elements 53 which are provided in the flow path defined by the passages 51. Air flow inwardly from the front end is effected by means of a fan 47 which is driven by motor 25 mounted in a rear end of the barrel 1. The fan draws air in a direction inwardly from the forward end of the projector and discharges it outwardly through the grillwork 26 of the closure means 6.

The chassis 1 is also cut away on each side at 8 to afford access for a loader or slide member 10 which holds objects such as a slide 12 for presentation or reproduction. The loader or slide 10 may be inserted through the openings 8 at right angles to the axis of the barrel or chassis 1. Loader securing means 9 are provided to hold the loader in place when it is positioned within the chassis 1. The securing means advantageously comprises a latching member which may be depressed from the exterior of the projector for the purpose of releasing the loader 10. At the base of the chassis 1 at the location of openings 8 is a loader distributor 11 which is arranged to make contact with the bottom of the loader 10 when the latter is positioned therein. The distributor 11 establishes connection between the electrical system of the apparatus and the electrical system of the loader 10. The loader 10 itself carries the objects for presentation such as the slide 12 or which may be, for example, diapositives, stencils, diaphragms, grids and the like.

To the rear of the loader chamber 8 is a frame member 15 which forms a front end guide for the condenser lens system and also is slotted to define restricted openings 28 and 30 for the flow of cooling air therethrough.

A feature of the invention is that the condenser lenses 17 are mounted in novel lens mounting brackets or holders generally designated 16 which, in the embodiment indicated, includes three separate brackets and condenser lens assemblies. The chamber defined in the barrel 1 between a frame 15 and the rear of the barrel is large enough to accommodate a plurality of condenser lens mounting brackets 16 in a position ahead of a lamp 18. The lamp 18 is secured in a lamp socket 19 formed in a lamp holder 20. A reflector 21 is mounted on a support 22 behind the lamp 18.

On the lower side of the tubular chassis 1 approximately below the lamp 18 there is secured the grip 23, the lamp holder 20 being located within the grip and projecting into the tubular chassis 1 therefrom. Grip 23 is reinforced by a guard 24 defining an opening for access of the hands in the manner of a pistol, the guard 24 being curved from the housing downwardly to the lower end of the grip 23.

In accordance with a principal feature of the invention, the projector is constructed with the main barrel or chassis 1 arranged to receive air flow in three separate air streams. The rear portion of the barrel 1 in which the fan 47 is arranged constitutes a main flow duct into which first, second and third secondary air flow passages or ducts are arranged to flow. The converging of the air ducts is advantageously arranged in the location of the lamp, that is, in the space between the condenser brackets 16 and the reflector support 22.

In FIG. 3 there is indicated a passage arrangement which is arranged to define a first in-flowing air duct or flow path generally designated A and represented diagrammatically by means of the wide arrows. As represented, the outer confines of the first air duct are partially defined by the inner wall of the inner face of the outer curved wall 57 and the inner boundary of the duct is defined by the outer faces 27 of the mounting brackets 16. The air ducts thus comprise four separate sectors of a circle, for example, an upper sector 54, a lower sector 55 and right and left hand sectors 56, 56. The condenser brackets 16 are constructed with curved upper wall portions 57 above the sector 54 which conforms generally to the outline of the outer sliding casing cap 5. A feature of the construction of the condenser lens mounting 16 is that the curved wall portions 57 define spaced open areas forming the ducts which may be gripped by the fingers of the hand for removal and replacement of the condenser lens assemblies.

The brackets 16 are provided with side openings 108 in order to provide for cross flow or transverse air cooling currents over lenses 17 which are centrally mounted in the brackets 16. By such means there are produced differential pressures which are dependent on the cross-sectional form given to the openings 108. In order to amplify the transverse currents, throttle or directional baffle plates 28 (FIG. 3) are provided. The throttle plates 28 are arranged to vary the speed of cooling air flow and provide a pressure differential for flow across the lenses of the condenser system.

A first passage air flow path is defined by the wire arrow designated A (FIG. 3) and it originates at openings 49 defined on each end of a curved baffle plate 110 of the loader 10. Flow is inwardly through a central opening defined in each side of the loader 10 in which is arranged filtering material 53. Flow is effected around all of the parts of the loader 10 including a slide 12 and also through circumferentially spaced openings 48 arranged in an annular portion around the slide. Thereafter, as indicated in FIG. 4, the flow from the loader 10 joins with a secondary flow portion of the first air flow passage coming from the forward end of the projector. This secondary flow is designated B and the passage is defined by circumferentially spaced openings 51 of brackets 52 which hold the objective lenses 104 and also of the openings 51' of front brackets 106. The flow at B joins the flow of A at the location of the loader 10 and flow continues through the annular openings defined by the bracket 16 as indicated by arrows A shown in FIG. 3.

The last condenser lens bracket is shaped so that the flow through the annular openings thereof at 54, 55 and 56, 56 is directed radially inwardly and against the center of lamp 18. The flow arrangement is such that the cooling air in the first duct path A passes over the less warm parts first and then over the hotter portions thereafter. The flow in the first path A is thus over the object 12, then over the condenser mounting 16 and condenser lenses 17 from the loader end to the lamp end and then directly over the high temperature lamp 18 at the central portion thereof. In this manner temperature difference between the cooling air and the parts to be cooled in the duct passage A is always maintained as high as possible to obtain the best possible heat transfer.

In the embodiment illustrated, secondary radiation passes through the openings 103 on the sides of the brackets 16 and impinges directly against the inner face of the tubular chassis 1, in order to avoid the direct radiation against the inner face of the tubular chassis 1. In order to avoid the direct radiation against this interior face of the chassis, means such as radiation intercepting plate 3 are connected directly to the chassis in a manner permitting cooling air flow on both sides thereof.

Flow in the secondary duct path B which joins the first duct path A insures that a cooling air flow will wash the pocket 50 which exists between the objective lens system 7 and the loader 10 and also prevent a clouding over of the objective lenses of the lens system 7.

In FIG. 5 a second flow passage or air duct is illustrated generally by the flow pattern shown by the wide arrows designated D. In this arrangement cooling air flow originates at inlets 31 defined in sliding cap casing 5 on each side thereof adjacent the pistol grip portion 23. The inlets 31 are at axially spaced locations in the vicinity of the portion of the chassis provided for the mounting of the condenser lens bracket 16. The outer confines of this secondary air duct are defined by the inner face of the sliding cap 5 and the inner boundary is defined by the outer face of the tubular chassis 1. The slots 31 are arranged in close proximity to the grip 23 in order to provide initial cooling at such location. The inner face of the sliding cap 5 is provided with an annular rib 32 which insures that the air flow will be upwardly around the tubular chassis 1 and over perforated portions or ribs 35 formed thereon to increase heat transfer. Flow is thereafter through top opening 33 defined in the upper end of the tubular chassis which also permits access for insertion and removal of the lamp 18 and the condenser lens brackets 16. The flow through the duct D continues downwardly into the tubular chassis at which point it joins a main air stream indicated E which also includes the flow from the first duct A and the secondary duct B.

The cooling air in the second air duct B flows at first against the less warm parts and then successively against progressively hotter parts, namely the outer face of the tubular chassis 1 and the inner face of the sliding cap 5 from the lower end upwardly around the side and from the front of the pistol grip toward the rear of the chassis and downwardly over the projector lamp. The temperature difference between the cooling air and the parts to be cooled accordingly remains as great as possible along the second duct path indicated by the arrows D.

The lamp 18 radiates directly through the opening 33 against the inner face of the sliding cap 5. In order to avoid a temperature peak against the face of the cap 5, there is provided a radiation intercepting plate 34 (FIG. 1) which is washed on its sides by the cooling air of the second air duct D. The rib 32 insures that the air in the second duct D does not take the shortest path to the opening 33 but rather flows upwardly around the tubular chassis 1.

In FIG. 6 there is indicated the pistol grip 23 through which a third air duct or path generally indicated by the large arrows F is provided. Air enters the third air duct F through an annular gap 41 located between a socket 42 for the electric lead and the opening therein which contains a plug 44. The lead 43 terminates in the socket 42. Cooling air flows in the direction of the axis of the socket 42. The annular passage turns upwardly and outwardly and opens from below into the main duct. The opening into the main duct is formed by the gap between a lamp holder opening 45 on the lower side of the tubular chassis and a lamp holder 20. The smaller thin line arrows represent the actuating element 36 and the pistol grip slot 37. Generally, the third air duct F is an annular passage formed by the space between the inner wall face of the grip and the outer wall faces of the switch 39, the main distributor 40 and the lamp holder 20. Thus, as in the previous air flow passages, the cooling air through the third air duct F flows first over the less warm parts and then over the hotter parts at the location of the lamp 18. Cooling air is thus directed over the connection 43, the connection socket 42, the plug 44, the switch 39 and main distributor 40, the spring contact 46 of the lamp socket, the hot lamp holder 20 and the still hotter lamp socket 19, and the lower part of the lamp bulb 18. The difference in temperature between the cooling air and the parts to be cooled remains as great as possible over the entire path of movement of the cooling air in the third air duct passage F. The additional air which enters through the gap 38 and the slot 37 washes the main lamp holder 20 and the lamp socket 19 with practically fresh air from the outside, whereby the temperature difference reaches a maximum. In consequence, this additional air provides an effective cooling of the lamp holder 20 and the lamp socket 19. In some instances it is desirable to provide for baffling means in the slot 31 to regulate the cooling effect on the lighting system of the apparatus. Radiation intercepting plates 30 on each side of the lamp prevent the inner wall of the tubular chassis 1 from reaching a high temperature condition.

Cooling air from the duct F joins in the main air stream after contacting the lamp 18 and is discharged along with the main portion indicated at E (FIG. 5) through the rear of the closure means 6.

In order to replace the lamp or one of the condenser lenses, it is merely necessary to rotate the collar 6 and to slide the sliding casing 5 backwardly to expose the opening 33. Replacement of the lamp or the condenser lenses is effected through this opening.

While a specific embodiment of the invention has been shown and described in detail to illustrate the application of the inventive principles, it will be understood that the invention may be embodied otherwise without departing from such principles.

What is claimed is:

1. A projector comprising a tubular chassis having an access opening defined in the top thereof, a projection lamp positioned in said chassis adjacent one end, objective lens means positioned in said chassis adjacent an opposite end and condenser lens means positioned in said chassis intermediate the length thereof in alignment with said opening, a fan in said chassis adjacent the rear thereof arranged to draw air over each of said condenser lens, said objective lens and said lamp, a casing surrounding said chassis including a portion spaced therefrom to define a second air flow passage, inlet means for said second air flow passage in said casing at the lower portion thereof spaced remotely from the opening in the top of said chassis, said condenser lens means including a plurality of annular passages defined adjacent the walls of said chassis, an inlet opening communicating with said annular passages formed in said chassis intermediate its length, said objective lens means including annular openings forming air flow passages communicating with the forward end of said chassis to define with the passages formed by said condenser lens means a first air flow passage, a pistol grip connected to said chassis including wall means defining a third flow passage extending into said chassis, said first, second and third flow passages joining in the interior of said chassis at the location of said lamp.

2. A high power light and image projector having means for guiding cooling air and having a loader for the objects for presentation, comprising a tubular chassis having a main duct and at least three air ducts which open out into said main duct, said tubular chassis including an outer casing provided with inlet apertures and discharge baffles provided with a sliding cap, said tubular chassis being provided with a loader chamber having loader securing means and a loader distributor therein, a loader for holding the object to be projected, said loader chamber containing said loader, a lighting system in said chassis including condenser mountings, and a hollow grip secured to the underside of said tubular chassis and passing through the casing, said first air duct being defined by the space between said condenser mountings and said tubular chassis, said second air duct being defined by the space between said sliding cap and said tubular chassis, said third air duct being defined by the walls of said grip, said main duct containing a blower, so that cooling air for the three passages entering through said inlet apertures from the outside, combines in said main duct, after traversing the said three ducts, to form a single current which passes again to the outside through said discharge baffles.

3. A light and image projector according to claim 2, wherein said first air duct possesses substantially the cross-sectional form of four sectors of a circle.

4. A light beam and image projector according to claim 2, condenser lenses carried by said condenser mountings, said condenser mountings being furnished with openings to that dependent on the cross-sectional form applied to these openings, there are produced as a result of the differential pressure in said first air duct, transverse currents which flow through the spaces between the condenser lenses.

5. A light and image projector according to claim 4, characterized in that means for amplifying the transverse currents are provided in the first air duct, and including baffle and throttle plates, whereby the differences in pressure and the transverse currents thus brought about are intensified.

6. A light and image projector according to claim 2, characterized in that the initial portion of said first air duct is located in the rear plane of said loader chamber and possesses substantially the cross-sectional form of four sectors of a circle.

7. A light and image projector according to claim 2, characterized in that in said first air duct there are provided radiation intercepting plates which are washed by the cooling air on both sides.

8. A light and image projector according to claim 2, characterized in that said loader possesses at its rear a cross-sectional form corresponding to those existing in the initial part of the first air duct to form a preliminary duct for entry of the air into said first duct.

9. A light and image projector according to claim 2, characterized in that said second air duct possesses at least three inlet slots on each side to the left and right of said grip on the lower side of said sliding cap, said slots being in close proximity to said grip.

10. A projector comprising a tubular chassis having an access opening defined in the top thereof, a projection lamp positioned in said chassis adjacent one end, objective lens means positioned in said chassis adjacent an opposite end and condenser lens means positioned in said chassis intermediate the length thereof in alignment with said opening, a fan in said chassis adjacent the rear thereof arranged to draw air over said condenser lens means, said objective lens means and said lamp, a casing surrounding said chassis including a portion spaced therefrom to define a second air flow passage, inlet means for said second air flow passage in said casing at the lower portion thereof spaced remotely from the opening in the top of said chassis, said condenser lens means including a plurality of annular passages defined adjacent the walls of said chassis, an inlet opening communicating with said annular passages formed in said chassis intermediate its length, said objective lens means including annular openings forming air flow passages communicating with the forward end of said chassis to define with the passages formed by said condenser lens means a first air flow passage, a pistol grip connected to said chassis including wall means defining a third flow passage extending into said chassis, said first, second and third flow passages joining in the interior of said chassis at the location of said lamp, said inlet formed intermediate the length of said chassis defining a loader opening, and a loader for holding an object to be projected removably positioned in said chassis having an opening therein for the inflow of air to said first flow passage.

11. A projector comprising a tubular casing open at each end for the axial flow of a stream of cooling air therethrough, fan means connected to said casing for circulating air through the interior of said casing, means for mounting a projection lamp in said casing, lens means disposed in said casing, supporting and positioning means for said lens means in said casing defining an axial air flow path around the periphery of said lens means, means defining air inlet intermediate said casing length, means defining an annular air flow path extending from said air inlet around the interior of said casing and thence into the axial flow stream of cooling air in the vicinity of said projection lamp mounting means, and means connected into said casing directly adjacent said projection lamp mounting means for directing an additional cooling air flow into the axial air flow path at the location of said projection lamp mounting means.

12. A projector comprising a tubular casing open at each end for the axial flow of a stream of cooling air therethrough, fan means for circulating air through the interior of said casing, means for mounting a projection lamp in said casing, lens means disposed in said casing, supporting and positioning means for said lens means in said casing defining an axial air flow path along the interior of said casing and around the periphery of said lens means, means defining first air inlet means at a location intermediate the length of said casing, means defining an annular air flow path extending from said first air inlet means around the interior of said casing in circumferential directions and then in a radial direction into the axial flow stream of cooling air in the vicinity of said projection lamp mounting means, and means connected into said casing directly adjacent said projection lamp mounting means for directing an additional cooling air flow into the axial air flow stream at the location of said projection lamp mounting means, said last named means being a tubular extension accommodating electrical connections for said projection lamp mounting means and supplying an air flow passage around said electrical connections leading into said casing adjacent said lamp mounting means.

13. A projector comprising an outer tubular casing, an inner tubular chassis spaced inwardly from said casing, bracket means for supporting a plurality of lenses within said chassis and defining with the interior wall of said chassis an axial flow path for the axial flow of cooling air from one end of said chassis to the opposite end around any lenses positioned in said lens brackets, an opening defined in said chassis adjacent the top thereof in the vicinity of said projection lamp mounting means, first inlet means defined in said casing adjacent the lower portion of said casing, said casing and said chassis defining an annular flow path from said first inlet means to said opening for the annular flow of cooling air around said chassis through the opening and into the axial air flow stream adjacent said projection lamp mounting means, a pistol grip connected to said tubular casing adjacent the bottom thereof in the vicinity of said projection lamp mounting means including a hollow handle portion for accommodating connections for said projection lamp mounting means and defining a cooling air flow path extending upwardly and into the interior of said chassis for joining the axial air flow path at the location of said lamp.

References Cited by the Examiner
UNITED STATES PATENTS

| | | | |
|---|---|---|---|
| 1,281,754 | 10/18 | Beck | 88—24 |
| 1,966,531 | 7/34 | Tint | 88—24 |
| 2,362,601 | 11/44 | Wengel | 88—24 X |
| 2,364,730 | 12/44 | Leskin. | |
| 2,449,362 | 9/48 | Bell et al. | 240—47 X |
| 2,779,236 | 1/57 | Pollan | 88—24 |

NORTON ANSHER, *Primary Examiner.*

EMIL G. ANDERSON, *Examiner.*